United States Patent
Thielman et al.

(10) Patent No.: US 8,305,914 B2
(45) Date of Patent: Nov. 6, 2012

(54) METHOD FOR SIGNAL ADJUSTMENT THROUGH LATENCY CONTROL

(75) Inventors: Jeffrey Thielman, Corvallis, OR (US); Mark Gorzynski, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 581 days.

(21) Appl. No.: 11/799,265

(22) Filed: Apr. 30, 2007

(65) Prior Publication Data

US 2008/0267069 A1 Oct. 30, 2008

(51) Int. Cl.
*H04L 12/26* (2006.01)

(52) U.S. Cl. ............ 370/252; 370/235; 348/14.12; 348/14.13

(58) Field of Classification Search .......... 348/14.12, 348/14.13, 14.01; 370/235, 231, 252, 260, 370/516

See application file for complete search history.

(56) References Cited

U.S. PATENT DOCUMENTS

| | | | | |
|---|---|---|---|---|
| 4,449,143 A * | 5/1984 | Dischert et al. | ........ | 348/441 |
| 5,434,913 A | 7/1995 | Tung et al. | | |
| 5,991,443 A * | 11/1999 | Gallery et al. | ........ | 382/232 |
| 5,995,518 A * | 11/1999 | Burns et al. | ........ | 370/503 |
| 6,104,392 A | 8/2000 | Shaw et al. | | |
| 6,182,125 B1 * | 1/2001 | Borella et al. | ........ | 709/218 |
| 6,466,248 B1 * | 10/2002 | Spann et al. | ........ | 348/14.08 |
| 6,654,825 B2 * | 11/2003 | Clapp et al. | ........ | 710/60 |
| 6,665,872 B1 | 12/2003 | Krishnamurthy et al. | | |
| 6,741,563 B2 | 5/2004 | Packer | | |
| 6,760,749 B1 | 7/2004 | Dunlap et al. | | |
| 6,829,391 B2 * | 12/2004 | Comaniciu et al. | ........ | 382/243 |
| 6,940,826 B1 * | 9/2005 | Simard et al. | ........ | 370/260 |
| 6,963,353 B1 | 11/2005 | Firestone | | |
| 7,007,098 B1 * | 2/2006 | Smyth et al. | ........ | 709/233 |
| 7,016,407 B2 | 3/2006 | Kaye et al. | | |
| 7,024,045 B2 * | 4/2006 | McIntyre | ........ | 382/239 |
| 7,039,241 B1 * | 5/2006 | Van Hook | ........ | 382/232 |
| 7,042,843 B2 * | 5/2006 | Ni | ........ | 370/231 |
| 7,092,002 B2 * | 8/2006 | Ferren et al. | ........ | 348/14.08 |
| 2002/0172153 A1 | 11/2002 | Vernon | | |
| 2003/0035645 A1 * | 2/2003 | Tanaka | ........ | 386/69 |
| 2003/0223497 A1 * | 12/2003 | Suzuki et al. | ........ | 375/240.21 |
| 2004/0131067 A1 | 7/2004 | Cheng et al. | | |

(Continued)

FOREIGN PATENT DOCUMENTS

WO WO-2000/0076222 12/2000

OTHER PUBLICATIONS

Non-Final Office Action mailed Nov. 26, 2010. U.S. Appl. No, 11/492,393.

(Continued)

*Primary Examiner* — Hassan Phillips
*Assistant Examiner* — Ajay Cattungal (57) ABSTRACT

A method for adjusting latency in a video conference signal originating from a video conference camera and encoder is described herein. Latency in a video conference connection between more than two video conference sites is measured. The latency between each of the more than two video conference sites is compared with a latency threshold. Parameters of the video conference camera and encoder associated with each video conference site are adjusted by a video controller to modify the image quality of the video signal if the measured latency of a respective video conference connection is below the threshold.

14 Claims, 4 Drawing Sheets

U.S. PATENT DOCUMENTS

| | | | |
|---|---|---|---|
| 2004/0148423 A1* | 7/2004 | Key et al. .................... 709/235 |
| 2004/0184523 A1* | 9/2004 | Dawson et al. ............ 375/240.1 |
| 2004/0208388 A1* | 10/2004 | Schramm et al. ............. 382/254 |
| 2005/0073575 A1* | 4/2005 | Thacher et al. ............ 348/14.13 |
| 2005/0132264 A1* | 6/2005 | Joshi et al. ................. 715/500.1 |
| 2005/0232151 A1 | 10/2005 | Chapweske et al. |
| 2005/0237931 A1 | 10/2005 | Punj et al. |
| 2005/0243923 A1* | 11/2005 | Sugiyama ................ 375/240.15 |
| 2006/0077902 A1* | 4/2006 | Kannan et al. ................ 370/250 |
| 2006/0230176 A1* | 10/2006 | Dacosta ........................ 709/235 |
| 2007/0024705 A1* | 2/2007 | Richter et al. ................ 348/142 |
| 2007/0091815 A1* | 4/2007 | Tinnakornsrisuphap et al. ............................ 370/252 |
| 2007/0183493 A1 | 8/2007 | Kimpe |
| 2008/0043643 A1 | 2/2008 | Thielman et al. |
| 2008/0084900 A1* | 4/2008 | Dunn ............................ 370/516 |
| 2008/0109368 A1* | 5/2008 | Read et al. ...................... 705/59 |

OTHER PUBLICATIONS

Si Jun Huang, "White Paper, Principle, Benefits and Applications of Variable Bit Rate Coding for Digital Video . . . ", Scientific-Atlanta, Inc., Jun. 2000, pp. 1-10, Norcross, GA.

The International Search Report and the Written Opinion of the International Searching Authority for International Application No. PCT/US2007/073913 dated Jul. 12, 2007, p. 13.

Final Office Action dated May 16, 2011. U.S. Appl. No. 11/492,393.

* cited by examiner

METHOD FOR SIGNAL ADJUSTMENT THROUGH LATENCY CONTROL

BACKGROUND

Latency is the total time delay in the transmission of a signal between two locations. Latency becomes an important parameter in video transmission for video conference systems, for example, because excessive signal delay can become noticeable and affect the quality of the conference.

Video conference systems typically employ video encoders to transmit data between conference sites via a network (e.g., a private computer network, the Internet etc.). Many video conference encoder systems are configured to reduce latency as much as possible, to prevent excessive and noticeable delay in the transmission. However, there is a point at which latency becomes unnoticeable, and further reduction of latency provides no noticeable benefit.

BRIEF DESCRIPTION OF THE DRAWINGS

Various features and advantages of the invention will be apparent from the detailed description which follows, taken in conjunction with the accompanying drawings, which together illustrate, by way of example, features of the invention, and wherein.

DETAILED DESCRIPTION

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

The present disclosure relates to latency in the transmission of signals, especially video signals, such as for video conferencing and the like. Latency is the total time delay in the transmission of a signal between two locations. In a network connection, latency is a measure of the amount of time it takes for a packet to travel from a source to a destination. In general, latency and bandwidth define the delay and capacity of a network.

Latency is a relevant parameter in video transmission, such as for video conferences, because excessive signal delay can become noticeable. When signal delay becomes excessive, the experience of the video conference can deteriorate. To use a familiar example, when long distance (i.e. international) telephone calls are transmitted via satellite, they can sometimes experience a relatively large transmission delay. This signal delay or latency can cause the participants to unintentionally talk over each other, making communication difficult. This same type of problem can be experienced with video conference transmissions.

One of the key contributors to latency is distance. For example a connection between two conference rooms on different continents could exceed 200 ms due to the speed of light and routing of fiber optic cables. On the other hand, a short distance connection, such as between cities on the west coast of the United States, could have only 5 or 10 ms of delay.

Figure 1:
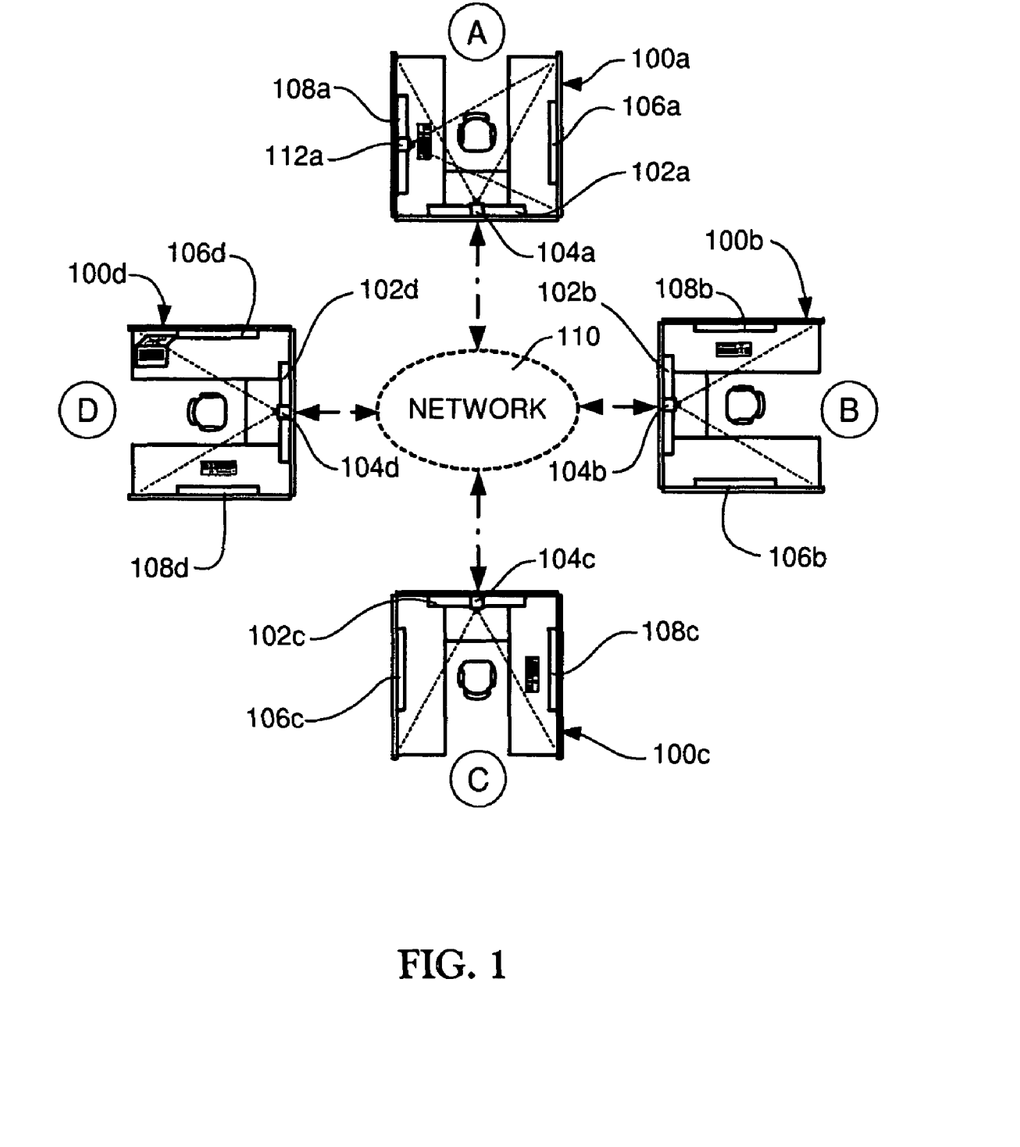
FIG. 1 is a plan view of a four cubicles that are interconnected in a roundtable type video conference arrangement.
Figure 2:
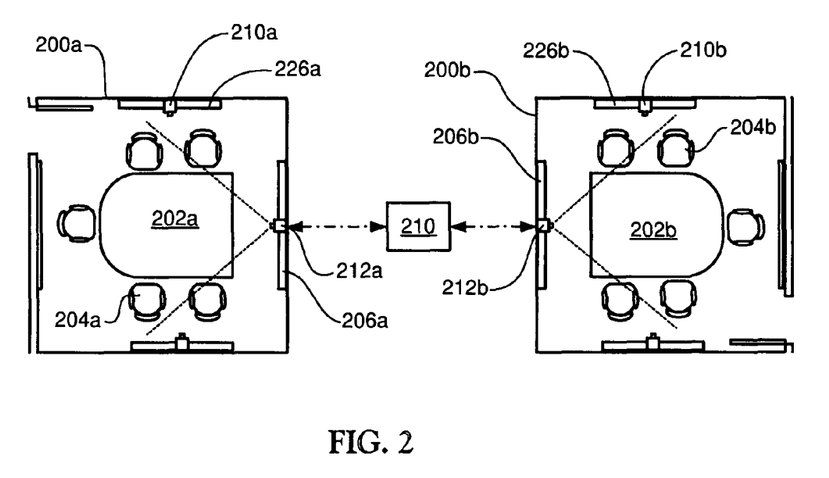
FIG. 2 is a plan view of a pair of conference rooms interconnected in a video conference arrangement.

Two examples of video conference connections are shown in FIGS. 1 and 2. Shown in FIG. 1 are four video conference cubicles 100 (labeled 100a-d) that are interconnected via a network 110 in a virtual roundtable video conference session. Each cubicle is at a location that is remote from the others, though they are shown arranged as if in a circle. The cubicles each include a primary video conference display 102 and a video conference camera 104. The camera takes an image of the participant in the cubicle, and this image can be shown on the video conference display in each of the other cubicles. The video conference display device (and other display devices) shown in FIG. 1 is depicted as a flat panel-type screen, though many types of displays can be used, including CRT's, LCD screens, plasma screens, projection displays, etc.

The cubicles 100 can also include additional video display devices, such as a left hand display 106 and a right hand display 108, and can include one or more additional video cameras, such as the camera 112a in cubicle A. The additional camera can provide an additional video conference view perspective. The additional display devices can be used as data displays to provide common reference data to the conference participants, or they can be used as additional video conference displays. For example, the images of the conference participants can appear in positions that correspond to their position on the virtual roundtable. This can be done in a split-screen fashion on the primary video display 102. That is, the participant in cubicle A sees an image of the person from cubicle B on the left side of the primary video conference display, the image of the person in cubicle D on the right side of the primary video conference display, and the image of the person in cubicle C in the center of the primary video conference display. The same roundtable positioning scheme can be followed for the video conference displays of the other cubicles. During the conference, one or more of the additional display devices 106, 108 can then be used to display data or other reference materials to which the participants can refer during their conference. This helps provide the look and feel of an in-person conference.

Alternatively, in the roundtable format, the images of the conference participants can appear on the both primary video conference display 102 and the additional displays 106, 108 in positions that correspond to their position on the virtual roundtable. That is, the participant in cubicle A can see the image of the person from cubicle B on the left hand display 106a, the image of the person in cubicle D on the right hand display 108a, and the image of the person in cubicle C on the primary video conference display 102a in the center. In this way the video conference system provides the appearance that the cubicles are adjacent to each other, and that the participants are having a conference between adjacent cubicles, as if there were a transparent window between the cubicles.

The video conference environment is not limited to a cubicle sized for a single person, but can also be a conference room or the like. Such an environment is shown in FIG. 2, where two remote conference rooms 200, each containing a conference table 202 and multiple chairs 204 for conference participants, are interconnected for remote collaboration. Each conference room includes a video conference camera 212 and a video conference display 206 positioned on a front wall of the room. The camera of each room takes an image that is provided to the video conference display of the other room, providing the illusion that the conference participants are in adjacent rooms with a window therebetween. Each room can also include additional reference display devices 226 for use as reference displays and/or as additional video conference displays, and additional video cameras 210.

Though not shown FIGS. 1 and 2, it will be appreciated that the video conference cameras, displays, reference displays, etc. will typically be controlled by local microprocessor and data input devices (e.g. a PC with keyboard, mouse, etc.) to allow the conference participants to see and hear each other, to view reference materials, and to manipulate reference information. These local devices can be connected to each other through one or more network systems that allow communication between the various conference rooms. In FIG. 1 the four conference cubicles are connected via a network 110, and in FIG. 2 the remote conference rooms are similarly interconnected by a network 210. These network connections may include a single local network of computer hardware, or multiple computer networks that are interconnected (e.g. via the Internet) to provide communication between the rooms. Whether the video conference is over a single local network or is routed through multiple network systems and connections across a vase distance, these network connections will each introduce some delay or latency into the transmitted video signals. If this latency is too high, the quality of the video conference experience will deteriorate.

However, there is a point at which latency becomes unnoticeable, and further reductions in delay provide little or no benefit. Since the experience in both widely separated and geographically close systems mentioned can be acceptable so long as the total latency does not exceed some threshold, the additional available latency (up to the threshold) can be used to provide a higher quality video signal. The inventors have recognized that adjustments can be made within a camera system that will affect both latency and consumed bandwidth, while still keeping latency within an acceptable range. These adjustments can be varied to ensure that latency does not diminish the desired video conference experience. Even in a long distance connection, modifications can be made which will allow a lower latency, lower quality encoding to be used and still achieve acceptable quality.

In this context, it is worth noting that "temporal quality", which relates to immediacy or perceived delay in the video signal, is not the same as "image quality". References herein to increasing the quality of a video signal by adjusting latency relate to increasing the image quality. The video encoding performed under the method disclosed herein adjusts video compression (affecting the image quality) at the cost of latency and/or bandwidth. More latency degrades temporal quality, and more bandwidth affects the cost of the system.

Figure 3:
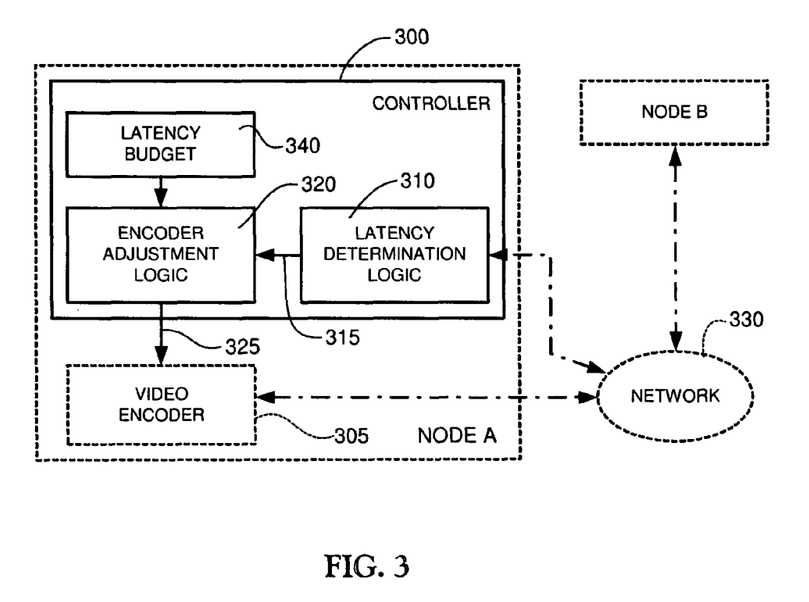
FIG. 3 is a block diagram representing one embodiment of a video controller.

A block diagram illustrating one embodiment of a controller 300 that is configured to adjust the signal parameters of a video encoder 305 is shown in FIG. 3. Some components in FIG. 3 are shown in dashed lines to indicate that these components are not part of the system of the controller. Other system embodiments described herein can include one or more of these components in combination with each other, including a modified version of the embodiment of FIG. 3.

With reference to FIG. 3, the controller 300 can provide an encoder adjustment signal 325 to adjust the video encoder 305 based, at least in part, upon latency determined between a first video conference node 1 and a second video conference node B, after that latency has been compared with a latency budget 340. Nodes A and B can be individual conference rooms or cubicles or the like that communicate with each other via a network 330. The controller 300 can include latency determination logic 310, which determines latency between the nodes A and B. The determined latency can then be provided as a determined latency signal 315.

The latency determination logic 310 can measure the network latency between nodes A and B at connection initiation—i.e. when the video conference connection is established. Alternatively, the latency determination logic can periodically measure network latency in order to dynamically react, for example, to changes in network traffic and/or topology. Latency can increase, for example, if latency intensive tasks are undertaken by any of the nodes that are interconnected in the conference session. Latency intensive tasks can include motion adaption, inclusion of bi-predictive frames (B-type frames), multi-pass encoding and the like.

Figure 4:
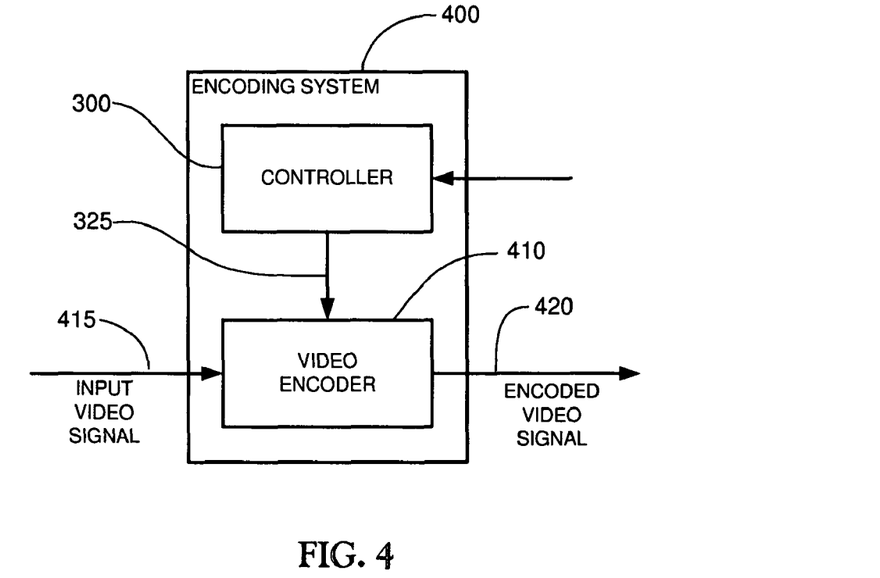
FIG. 4 is a block diagram representing one embodiment of a video encoding system.

Shown in FIG. 4 is a block diagram that illustrates an example video encoding system 400. The system 400 includes the controller 300 and a video encoder 410. The video encoder can be configured based, at least in part, upon the adjustment signal 325 to achieve a desired video signal quality improvement, in view of the latency budget. Once configured, the video encoder can receive a video signal 415, encode the signal, and provide an encoded video signal 420 output.

Figure 5:
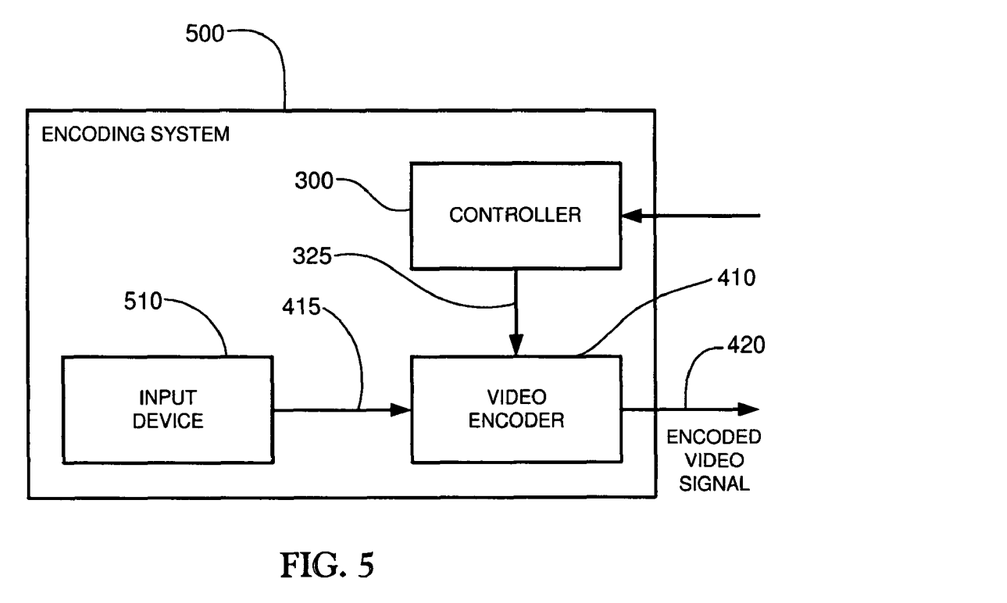
FIG. 5 is block diagram representing one embodiment of a video encoding system.

Shown in FIG. 5 is a block diagram that illustrates an example video encoding system 500. The system includes the controller 300, the video encoder 410 and an input device 510 (e.g., video camera(s) and/or microphone(s)). The input device provides the video signal 415 that the video encoder can encode.

Figure 6:
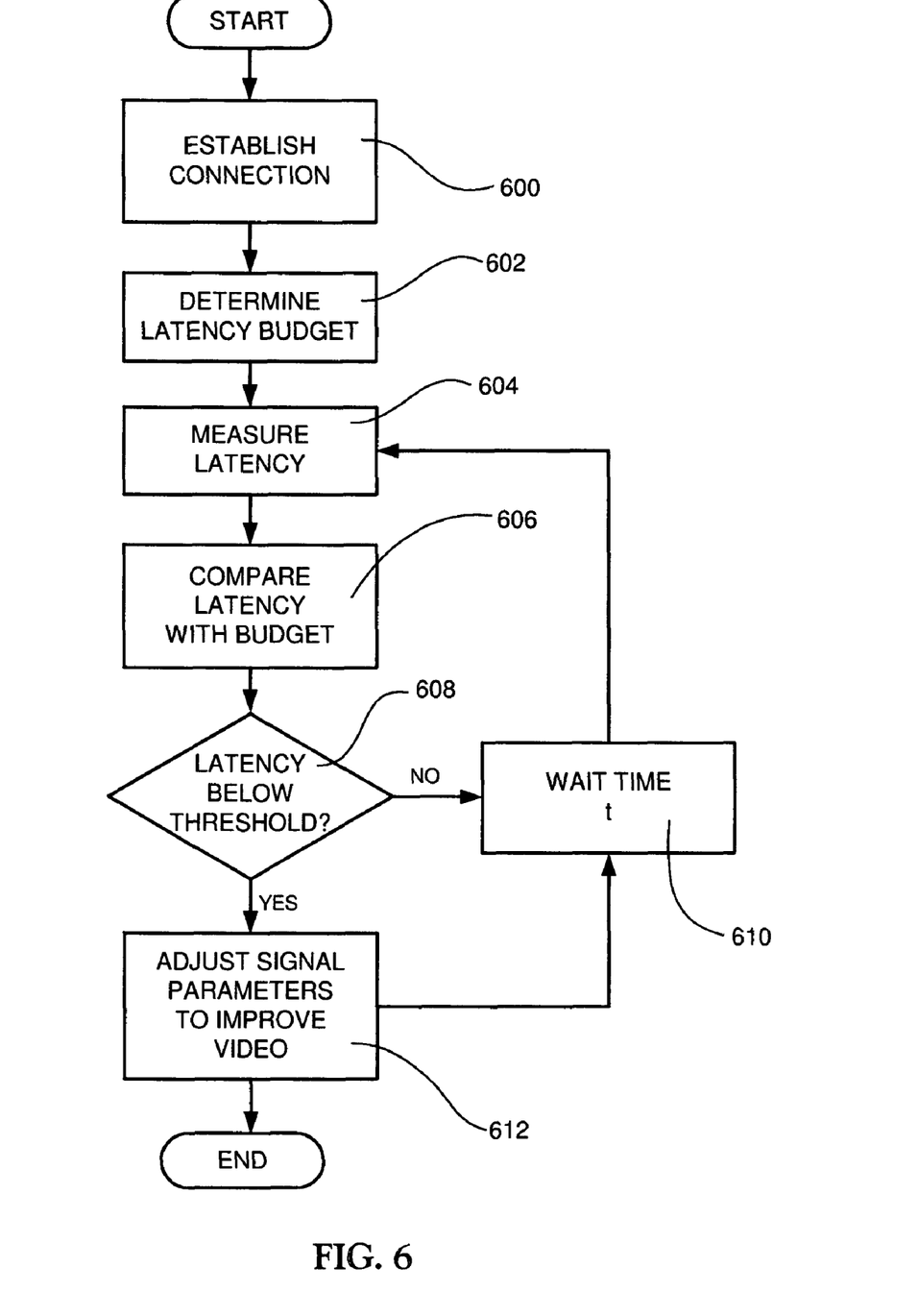
FIG. 6 is a flowchart of the steps involved in one embodiment of a method for signal adjustment through latency control.

Provided in FIG. 6 is a flowchart outlining the steps in one embodiment of a method for signal adjustment through latency control. When a remote conference is initiated, the first step is to establish the connection (step 600) between the remote locations. This can be two locations or more than two locations.

Another step in the method is to determine the latency budget (step 602). The latency budget is a set of one or more time periods, for example milliseconds. These time periods represent limits on end-to-end (total) latency required for levels of desired performance. A simple latency budget may contain one time period in milliseconds that represents the maximum latency allowed for acceptable performance. Alternatively, a latency budget could contain multiple time periods that represent increasing or decreasing levels of performance. For example, one may set a latency budget of 300 ms (level 1 performance) and 700 ms (level 2 performance). A latency threshold is a time period stated by the budget. For example, if a given connection has a measured latency above 300 ms, and the above latency budget applies, this connection will exceed the threshold and the budget for level 1, and will therefore fall into level 2.

The term "budget" is used because various components in the transmission system contribute portions of the total latency, each having their own latency. The video encoder latency will consume part of the overall latency budget. For example, if the overall budget is 300 ms and, at one site, the network and other components take 150 ms, this leaves 150 ms for the encoder at that site. Thus, the encoder has its own local budget of 150 ms. The levels of performance and overall latency budget can be established in advance, based on psychological experiments that help determine acceptable levels of delay. The local budget for encoding is established based on measurement of current conditions.

To allow comparison of the actual latency of a connection with the latency budget, the latency of the connection must be measured (step 604 in FIG. 6). Those skilled in the art will recognize that latency between nodes can be determined by a variety of methods. Measurement of latency can be based, for example, upon a "ping" command, which is a utility that can determine whether a specific network address is accessible. With the ping command, a data packet is sent to a specified address, and the elapsed time is measured until the specified address provides a return packet. Referring to FIG. 3, in one embodiment, the latency determination logic 310 determines the latency to be about one-half of the period of time from sending of the data packet to receipt of the return packet. Alternatively, the latency determination logic can issue a pre-determined quantity of ping commands, and determine latency based on the longest observed latency. This method helps take into account anomalies associated with routing delays for various paths that may exist between the first node and the second node.

As yet another alternative, latency can be based upon pre-determined values. For example, with a private network having a known topology, predetermined latency values can be stored in memory (e.g., in a lookup table), and the latency determination logic can simply refer to these values. The determined latency signal 315 can therefore be based, at least in part, upon the stored latency associated with the particular nodes participating in the video conference.

Referring to FIG. 3, in one embodiment, the adjustment signal 325 is provided to allow or cause the encoder 305 to adjust its video output parameters. Via the adjustment signal, the encoder adjustment logic 320 can adjust the video signal output of the encoder in a variety of ways that can increase, decrease and/or leave the latency unmodified. This is done by adjusting the encoding process used by the encoder in a variety of ways discussed below.

Referring back to FIG. 6, the encoder adjustment is made based upon a comparison of the detected latency with the latency budget (step 606). The decision to adjust latency and the extent to which the latency can be adjusted can be based on a threshold latency value. A latency threshold value is an acceptable network latency where video quality is not significantly impacted. For example, an 80-millisecond latency may have been determined to be an acceptable threshold latency where a video conference session has acceptable quality and speed. This may be determined based on user satisfaction with video conference sessions operating at the threshold latency, other user perceptions of quality, and/or a selected latency value. Thus, after comparison of the measured latency with the latency budget (or as part of it), the system considers whether the measured latency is below the latency threshold (step 608). There can also be multiple latency thresholds, such as low, medium or high latency, for example. The system can be set to one threshold by user selection, or the system can be programmed with operational criteria for selecting one latency threshold over another.

For a selected network connection between two particular nodes, the determined latency can be compared to the threshold latency. If the determined latency is at or about the threshold (i.e. neither above nor below the threshold) as determined at step 608, the video output quality can be left unmodified (e.g., no adjustment signal provider and/or adjustment signal left unmodified), and the system can simply wait some time interval t (step 610) before measuring the latency again (step 604). If the determined latency is above the threshold (i.e. the answer to the query at step 608 is "No"), the adjustment signal can be configured to make no change in the video output quality, and simply wait some time interval t (step 610) before measuring the latency again (step 604). Alternatively, where the determined latency is above the threshold, the adjustment signal can be set to cause the video encoder (305 in FIG. 3) to make adjustments to decrease latency. Such adjustments can cause the video camera to decrease the quality of the video output signal, or to increase bandwidth, or other options to reduce latency. If latency is too long (above threshold), we have the option of doing nothing (first part of paragraph) or making an adjustment to lower latency.

However, if the determined latency is less than the threshold (e.g., a predetermined latency threshold and/or a dynamically determined latency threshold) as determined at step 608, the encoder adjustment logic (320 in FIG. 3) can provide an appropriate encoder adjustment signal (325 in FIG. 3) to adjust the signal parameters to improve the video output signal as indicated at step 612. The adjustment signal can be configured to adjust the quality of the video output signal in a variety of ways. Depending on the available latency, different parameters can be set within a camera. For example, the adjustment signal can switch the video resolution between HD or SD resolution (or other resolutions). It can apply an image-smoothing algorithm to improve the image. It can adjust the camera frame rate, or it can switch between progressive and interlaced scanning. While all of these have the ability to affect performance of the system, they can also affect the latency in different types of processing.

Referring again to FIG. 3, the encoder adjustment logic 320 can also include an optimization algorithm that takes into account the various parameters that can be varied, such as those listed above. The algorithm can include minimum quality levels and maximum bandwidth levels programmed into it. This algorithm can be used to optimize the camera settings (i.e. the settings of the video encoder 305) to allow a certain desired latency level, and obtain the best possible video signal that can be attained at that level. This optimization algorithm can be based on a latency look-up table, a traditional optimization algorithm, or other optimization systems.

As an alternative to an optimization algorithm, the encoder adjustment logic can be programmed to provide an encoder adjustment signal 325 that causes the video encoder 305 to minimize bandwidth, maximize video quality, minimize latency, or minimize a function that is a combination of all three parameters. For example, assuming the encoder is a variable bit-rate encoder, the adjustment signal can provide one or more encoding parameters for the encoder to employ that increase the transmission bit-rate, which reduces latency by using increased bandwidth. As another example, when the latency is below a threshold, the encoder can be set to decrease the bit-rate, which increases latency and uses less bandwidth. If there are multiple thresholds (e.g. low, medium and high latency) corresponding to low medium and high perceived immediacy, it is possible to select a higher latency to achieve better bandwidth allocation. Selecting a higher latency threshold can also be undertaken to increase quality at constant bandwidth since there is a direct relationship between quality and latency. In this case, one can trade off latency to retain quality using latency thresholds as a guide helps us insure that the experience is constant and exceptable. It is also possible to balance latency across multiple signals (e.g. in a multipoint video conference session) at lower or higher latencies in a multiple latency threshold model.

Alternatively, the adjustment signal can set a quantity of buffer frames, identify one of the plurality of available encoders to employ and/or identify one of a plurality of compression algorithms to employ (e.g., Moving Picture Experts Group (MPEG), MPEG-s, MPEG-4, International Telecommunication Union (ITU) H.126, ITU H.263, H.264 and the like). It will be appreciated that the types of parameters that can be selected to adjust the encoder will vary based on the type of encoder used and the type of available parameters that are configured with the encoder.

With respect to a multipoint network connection (e.g., more than two nodes), a determined latency signal 315 can be obtained for each site. The encoder adjustment logic 320 can then provide an adjustment signal 325 based on the determined latency signal (e.g., on the longest determined latency). In one embodiment, the encoder adjustment logic can further provide an adjustment signal based on latency information received from one or more of the one or more sites (e.g., adjusted to balance and/or equalize latency between multiple nodes for example, to be within a specified tolerance).

In one embodiment, the encoder adjustment logical 320 can provide the adjustment signal 325 based on the information associated with the video conference to be conducted between the nodes. For example, with a paid video conference service, transmission quality (e.g., high, medium, low) can be proportional to a price paid. Thus, for example, the latency threshold and video output quality can be balanced for a video conference of a particular customer that decided upon a particular quality. Where a low quality conference is considered acceptable, the latency threshold can be relatively high, with correspondingly high video quality but greater delay, or the latency threshold can be kept relatively low for minimal delay, with a corresponding decrease in video quality. A variety of combinations of latency and video quality can be used to address a particular desired quality level.

In another embodiment, the encoder adjustment logic 320 can perform a static adjustment based on the determined latency signal 315. For example, for a determined latency signal of 15 milliseconds (ms) and a predetermined threshold of 80 ms, the encoder adjustment logic can provide an adjustment signal 325 to increase latency by 65 ms (e.g., relative adjustment value). Alternatively, the encoder adjustment logic can provide an adjustment signal to increase latency to 80 ms (e.g., absolute adjustment value). Of course, the encoder may not be capable of being set to a selected latency but rather can have various output signal parameters adjusted (e.g. the parameters discussed above) to change its encoding process in ways that are known to increase latency.

In yet another embodiment, the encoder adjustment logic 320 can dynamically determine the encoder adjustment signal 325 based, at least in part, upon the determined latency signal 315 for additional information. For example, the encoder adjustment logic can employ information regarding network traffic, network topology and/or anticipated network bandwidth. Thus, the encoder adjustment logic can be made to adapt to system changes.

Referring back to FIG. 6, after the encoder adjustment signal has been provided to the encoder at step 612, the controller can wait some time t (step 610) before returning to step 604 to again determine latency between the various nodes to confirm that the encoder adjustment signal has the intended effect on latency, and repeat the above steps in case the encoder adjustment signal has not had the desired effect, or if conditions have changed. In the event that the desired latency has not been achieved, the encoder adjustment signal can be modified as discussed above. Thus, the adjustment signal can be adaptively modified based on observed confirmation. The observed conditions can further include, for example, in-room performance feedback (e.g., adjustment of latency of an encoder until the room performance is satisfactory, as indicated by users of the video conference system).

This system and method disclosed herein thus allows the quality of a video signal to be adjusted in ways that increase latency if measured latency is below a threshold. The threshold can be a single maximum acceptable latency value, or it can represent any of several latency levels, which can be considered acceptable in different circumstances. The system and method can also be used to substantially maintain image quality, while increasing latency and decreasing bandwidth if measured latency is below the threshold. The system and method allows one to set thresholds for both latency and image quality, and allows a user to minimize bandwidth in some cases. If additional latency can be tolerated, or latency can be moved to a higher threshold, one can raise latency to maintain quality at decreased bandwidth.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A method comprising:
   a) measuring latency in video conference connections between more than two video conference sites participating in a video conference;
   b) comparing the measured latency for each connection to a latency threshold;
   c) based on results of comparing the measured latency for each connection to the threshold, determining, for each of at least two particular ones of the connections, that the measured latency is below the threshold, where each of the particular connections enables transmission of a video signal from an associated video conference camera and encoder at one of the video conference sites to another one of the video conference sites; and
   d) for each of the particular connections, adjusting, using a video controller, parameters of the associated video conference camera and encoder to increase a resolution of the video signal while maintaining bandwidth consumed by transferring the video signal at or below the bandwidth consumed by transferring the video signal prior to adjusting the parameters to increase the resolution as a consequence of having determined that the measured latency of the connection is below the threshold.

2. The method in accordance with claim 1, wherein adjusting parameters of the associated video conference camera and encoder to increase the resolution of the video signal comprises adjusting the resolution of the video signal from standard definition (SD) to high definition (HD).

3. The method in accordance with claim 1, wherein adjusting parameters of the associated video conference camera and encoder comprises applying an optimization algorithm to modify settings of the encoder to obtain a best possible video signal at a desired latency level that is below the threshold.

4. A method comprising:
   a) establishing a latency budget, the latency budget defining a latency threshold for video conference connections connecting more than two video conference locations participating in a videoconference;
   b) measuring latency in each video conference connection;
   c) comparing each latency measurement with the latency threshold;
   d) based on results of comparing each latency measurement with the latency threshold, determining that the measured latency in each of at least two particular ones of the connections is below the threshold, each of the particular connections enabling transmission of a video signal from an associated video conference camera and encoder system at one of the video conference locations to another one of the video conference locations; and e) for each of the particular connections, as a consequence of having determined that the measured latency in the connection is below the threshold, initiating additional image processing to the video signal to improve image quality of the video signal while maintaining a bandwidth consumed by transferring the video signal at or below the bandwidth consumed by transferring the video signal prior to initiating the additional image processing to the video signal to improve the image quality of the video signal.

5. The method in accordance with claim 4, wherein establishing the latency budget comprises programming the video conference camera and encoder system with a single maximum latency level that is considered acceptable.

6. The method in accordance with claim 4, wherein establishing the latency budget comprises programming the video conference camera and encoder system with multiple selectable latency levels.

7. The method in accordance with claim 4, wherein initiating additional image processing to the video signal includes initiating application of an image-smoothing algorithm to the video signal.

8. The method of claim 4 wherein initiating additional image processing to the video signal to improve image quality of the video signal as a consequence of having determined that the measured latency in the connection is below the threshold includes initiating additional image processing to the video signal prior to encoding the video signal to improve image quality of the video signal.

9. A computer-implemented method comprising:
accessing an indication of an acceptable latency level for a network connection for a video conference;
accessing an indication of latency in a network connection that connects a first video conference endpoint and a second video conference endpoint during a video conference and that enables a transfer of a video signal from the first video conference endpoint to the second video conference endpoint during the video conference;
accessing an indication of current bandwidth consumed by transferring the video signal;
comparing, using a processing element, the latency in the network connection to the acceptable latency level;
based on results of comparing the latency in the network connection to the acceptable latency level, determining, using a processing element, that the latency in the network connection is less than the acceptable latency level; and
as a consequence of having determined that the latency in the network connection is less than the acceptable latency level, increasing a resolution of the video signal while maintaining the bandwidth consumed by transferring the video signal with increased resolution at or below the current bandwidth.

10. A computer-implemented method comprising:
accessing an indication of an acceptable latency level for a network connection for a video conference;
accessing an indication of latency in a network connection that connects a first video conference endpoint and a second video conference endpoint during a video conference and that enables a transfer of a video signal from the first video conference endpoint to the second video conference endpoint during the video conference;
comparing, using a processing element, the latency in the network connection to the acceptable latency level;
based on results of comparing the latency in the network connection to the acceptable latency level, determining, using a processing element, that the latency in the network connection is less than the acceptable latency level; and
as a consequence of having determined that the latency in the network connection is less than the acceptable latency level, applying additional image processing to the video signal prior to encoding the video signal for transmission from the first video conference endpoint to the second video conference endpoint while maintaining a bandwidth consumed by transferring the video signal at or below the bandwidth consumed by transferring the video signal prior to applying the additional image processing to the video signal.

11. The method of claim 10 further comprising increasing the camera frame rate as a consequence of having determined that the latency in the network connection is less than the acceptable latency level.

12. The method of claim 10 further comprising adjusting a video scanning mode as a consequence of having determined that the latency in the network connection is less than the acceptable latency level.

13. The method of claim 12 wherein adjusting the video scanning mode includes switching from an interlaced video scanning mode to a progressive video scanning mode.

14. The method of claim 10 wherein applying additional image processing to the video signal prior to encoding the video signal for transmission from the first video conference endpoint to the second video conference endpoint as a consequence of having determined that the latency in the network connection is less than the acceptable latency level includes applying an image smoothing algorithm to the video signal prior to encoding the video signal for transmission from the first video conference endpoint to the second videoconference endpoint.

* * * * *